United States Patent

[11] 3,632,482

[72] Inventors Sadok E. Hoory
El Cerrito;
Stanley F. Newman, San Francisco, both of Calif.
[21] Appl. No. 856,296
[22] Filed Sept. 9, 1969
[45] Patented Jan. 4, 1972
[73] Assignee Shell Oil Company
New York, N.Y.

[54] PROPYLENE OXIDE RECOVERY FROM PROPYLENE BY EXTRACTIVE DISTILLATION WITH AN ALCOHOL-KETONE-HYDROCARBON SOLVENT
10 Claims, 1 Drawing Fig.

[52] U.S. Cl. .................................................. 203/56,
203/15, 203/62, 203/63, 203/69, 203/70, 203/78,
203/88, 260/348.5 L
[51] Int. Cl. .................................................. B01d 3/34,
C07d 1/04
[50] Field of Search .......................................... 203/15, 62,
63, 68, 69, 70, 88, 78, 84; 260/348.5 L

[56] References Cited
UNITED STATES PATENTS
3,350,417 10/1967 Binning et al. ............... 203/75
3,351,635 11/1967 Kollar ........................ 260/348.5 L
3,391,063 7/1968 Sennewald et al. ............ 203/69
3,398,062 8/1968 Tsao .......................... 260/348.5 R
3,427,229 2/1969 Herzog ....................... 203/69
3,464,897 9/1969 Jubin ......................... 203/68
3,476,776 11/1969 Sennewald et al. ........... 260/348.5 L Primary Examiner—Wilbur L. Bascomb, Jr.
Attorneys—John H. Colvin and E. Walter Mark ABSTRACT: Propylene oxide and propylene are separately recovered from a crude propylene oxide, produced by catalytic epoxidation of propylene with an organic hydroperoxide, and containing propylene oxide in admixture with propylene, water, and a hydrocarbon, an alcohol and/or a ketone corresponding to said organic hydroperoxide, by subjecting the crude propylene oxide to a two stage extractive distillation in the presence of a solvent mixture obtained from within the recovery system. In the first extractive distillation stage a portion only of the water and propylene is taken overhead under controlled conditions resulting in the willful retention of a substantial amount of propylene in the liquid bottoms. In the second stage, bottoms from the first extractive distillation are extractively distilled, at a lower pressure, to recover the remaining propylene and water overhead. Liquid bottoms from the second extractive distillation stage are passed into a fractionating zone wherein substantially pure propylene oxide is separated overhead and a fraction comprising said hydrocarbon, alcohol and/or ketone corresponding to said organic hydroperoxide is separated and a portion thereof recycled to said extractive distillation stages to be used therein as said solvent mixture obtained within the system.

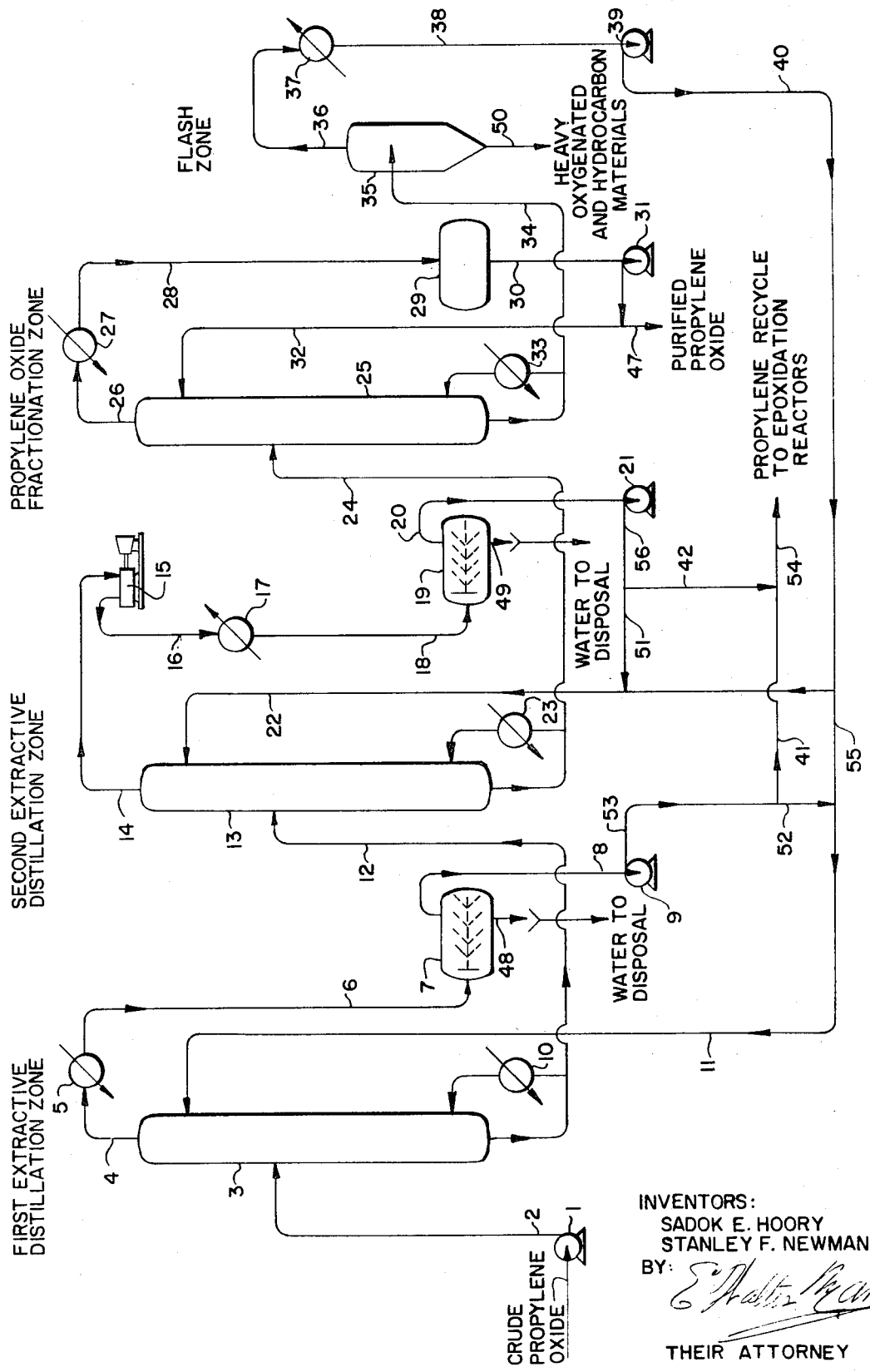

PROPYLENE OXIDE RECOVERY FROM PROPYLENE BY EXTRACTIVE DISTILLATION WITH AN ALCOHOL-KETONE-HYDROCARBON SOLVENT

BACKGROUND OF THE INVENTION

This invention relates to the resolution of crude propylene oxide containing mixtures produced by the epoxidation of propylene with an organic hydroperoxide.

Propylene oxide is an important chemical of commerce, enjoying wide application in urethane foam and solvents manufacture. Until recently, propylene oxide has been manufactured, on an industrial scale, by a single route involving hypochlorination of propylene to form propylene chlorohydrin, followed by hydrolysis of the chlorohydrin in an alkaline medium. This method of preparation requires that large quantities of chlorine, supplied at very low cost, be used as an essential raw material. After use, the chlorine appears as either calcium chloride or hydrochloric acid, neither of which is readily or economically recyclable to the manufacturing process.

Recent advances in catalysis have permitted the direct, efficient, and economical manufacture of propylene oxide-containing mixtures by reacting propylene with an organic hydroperoxide. In order to fully exploit the significant advantages inherent in the industrial application of such an epoxidation process, the ability to recover unconverted propylene, as well as the product propylene oxide is of paramount importance.

In forming propylene oxide by the reaction of propylene with an organic hydroperoxide in the presence of a suitable catalyst, the epoxidation reactor effluent will generally consist of propylene oxide mixed with unconverted propylene, water, and higher boiling oxygen-containing organic impurities. The specific composition of the higher boiling impurities will vary widely, being dependent upon the materials charged to, and conditions employed in, the epoxidation reactor system. Their complexity often renders difficult identification of the components. However, they will generally consist of aldehydes, ketones, ethers, alcohols and very minor quantities of organic hydroperoxides and/or peroxidic materials. Although these higher boiling oxygen-containing impurities are generally present in the crude propylene oxide mixture in only minor amounts, they nevertheless influence considerably the degree of resolution which can be attained. A highly desirable feature of any industrial recovery operation is that it not only permits recovery of the unconverted propylene efficiently, and in a high state of purity, but effects the recovery at pressure conditions which enable the recycling of propylene in the absence, or with a minimum, of repressuring equipment.

Characteristics peculiar to the crude propylene oxide mixtures obtained from processes wherein propylene is reacted with an organic hydroperoxide render impractical, and often impossible, the use of methods heretofore employed to effect the recovery of the propylene oxide. Thus the use of distillation conditions wherein all of the lighter constituents (i.e., propylene, water and propylene oxide) are taken overhead in the first distillation generally result in conditions of temperature and pressure in the distillation bottoms which not only can occasion the loss of substantial amounts of the propylene oxide, its coproducts, and unreacted organic hydroperoxide by further reaction, particularly in the presence of incompletely recovered, homogeneous epoxidation catalysts, but also which are hazardous because of the unstable nature of components of the higher boiling impurities often present, such as hydroperoxides, even though only in trace amounts Tempering the conditions prevailing in the distillation zone by reliance upon reduction of pressure generally necessitates a degree of temperature reduction which unavoidably results in the deposition of liquid water or solid ice and/or the formation of solid, hydrocarbon hydrates in the system, thereby rendering the operation highly impractical. Highly expensive increases in the size of practical scale distillation and repressuring means generally also result from operation at such reduced pressures.

Herzog, U.S. Pat. No. 3,427,229, and Schmidt, U.S. Pat. No. 3,449,219, teach different methods for resolving the crude propylene oxide-containing stream produced by the epoxidation of propylene with an organic hydroperoxide in the presence of a suitable, homogeneous catalyst. Herzog proposes the separation of such a crude propylene oxide-containing stream by passing said stream through two or more distillation columns, arranged in series, which collectively function as a depropanizer-type separation train. Schmidt discloses the addition of a hydrocarbon "flux" material to the crude propylene oxide stream, and thereafter recovering overhead all propylene contained in said stream in a single distillation zone. Critical to the successful operation of Herzog's multiple and Schmidt's single-column resolution scheme is the avoidance of temperatures, in the reboilers thereof, in excess of 140° C. Above this temperature, incompletely recovered amounts of the homogeneous epoxidation catalyst, such as those described in Sheng et al. U.S. Pat. Nos. 3,453,218, even though present in only very minor concentration, can occasion the loss of a substantial fraction of the propylene oxide, its coproducts, and unconverted organic hydroperoxides. Such resolution schemes may not only require costly refrigeration and propylene repressurization equipment, but may result in the deposition of liquid water or solid ice and/or the formation of gas hydrates in the rectifying sections of the distillation columns.

In copending application of Hoory et al., Ser. No. 817,721, filed Apr. 21, 1969, now U.S. Pat. No. 3,580,819, an improved process is described and claimed for the resolution of a crude propylene oxide, comprising propylene oxide in admixture with unconverted propylene, water, and higher boiling oxygen-containing organic impurities, by subjecting the crude propylene oxide to a two-stage distillation in the first stage of which a portion of the propylene is taken overhead and in the second stage of which propylene oxide is recovered as a top product in admixture with the remaining propylene. Propylene oxide is separated from the second stage distillation top product by selective absorption in an aqueous solvent.

BRIEF SUMMARY OF THE INVENTION

It has now been found that the difficulties to which heretofore disclosed processes have been subject are obviated to at least a substantial degree and crude propylene oxide mixtures, obtained by epoxidizing propylene with an organic hydroperoxides, are resolved with substantially improved efficiency in a novel recovery procedure comprising the extractive distillation of said crude propylene oxide in a plurality of successive extractive distillation zones with the aid of a solvent mixture consisting essentially of a mixture of hydrocarbons, alcohols, and/or ketones corresponding to said organic hydroperoxide employed in producing said crude propylene oxide, followed by fractionation of high-purity propylene oxide from liquid bottoms formed in a final zone of said plurality of successive extractive distillation zones.

In resolving a crude propylene oxide mixture produced by the catalytic epoxidation of propylene with an organic hydroperoxide, the key components to be separated are water and propylene oxide. Even though water is more volatile than propylene oxide, their separation will be extremely difficult if the crude propylene oxide can only be subjected to tempered conditions of pressure and temperature. The volatility of water, with respect to propylene oxide, as well as other heavier oxygenated and hydrocarbon materials present in the crude propylene oxide mixture, can be greatly enhanced, and the separation of the key components can be more easily facilitated, by the use of higher temperatures than heretofore practiced. This results from water's vapor pressure being a much stronger function of temperature. Because of the presence of an excess of propylene in the crude propylene oxide mixture, the use of higher temperatures, however, would raise the pressure substantially, and would occasion large increases in equipment and operating costs. What is required in order to take full advantage of water's increased volatility at higher temperatures, is some means of modifying the temperature profile in the crude propylene oxide resolution zone, and particularly in the rectifying section thereof, without materially raising the pressure therein.

It has now been discovered that the addition of a solvent to the zone wherein the crude propylene oxide is to be resolved alters the temperature profile in the above-described desired manner, i.e., raising it in the rectifying portion thereof, without materially increasing the pressure. Thus, the process of the present invention is very similar to an extractive distillation, in that both require the addition of an extractive solvent, and will be referred to as such for lack of better terminology. However, the methods of modifying the key component volatilities in classical extractive distillation and the process of the present invention are considerably different Classic extractive distillation involves the addition of an extractive solvent to a resolution zone in order to modify the liquid phase activity coefficients of the key components. Alternatively, the process of the present invention relies on the discovery that the addition of an extractive solvent to the zone wherein the crude propylene oxide is to be resolved can substantially alter the temperature profile therein; in particular, the temperature is raised in the rectifying portion thereof. This occasions the enhancement of the vapor pressure and, correspondingly, the volatility of water, without materially affecting the system operating pressure.

In addition, it has been discovered that the higher temperature level prevailing within the crude propylene oxide resolution zone, as occasioned by the addition of an extractive solvent thereto, not only prevents the separation of water as a distinct solid or liquid phase, but avoids the formation of solid hydrocarbon-water hydrates as well.

A minimum of one, and a maximum of two extractive distillation zones will be required to completely recover all the propylene and water originally contained in the crude propylene oxide mixture. The exact number is not critical, and will depend solely on the amount of excess propylene employed in the epoxidation reactor system. The crucial point is to raise the temperature prevailing within the extractive distillation zone or zones by the addition thereto of an extractive solvent.

It has further been discovered that a suitable extractive solvent can comprise a mixture of hydrocarbons, alcohols, and/or ketones corresponding to the organic hydroperoxide used to epoxidize the propylene. Thus, no extraneous components need be added to the resolution scheme, and no additional facilities provided for their recovery.

Finally, it has been discovered that the extractive solvent mixture, which may or may not contain propylene to be refluxed, may be added to the extractive distillation zones at a most unusual location, i.e., on the topmost stage of each zone, without misoperation thereof. In an ordinary extractive distillation zone, the solvent cannot be introduced on the top stage because of few stages must be provided above the solvent entry point to reduce the solvent concentration to a negligible amount before the overhead product is withdrawn. Little of the extractive solvent mixture will be entrained or vaporized into the overhead product, when it is added to the topmost stage of each extractive distillation zone, since said mixture is relatively nonvolatile in comparison with the major components in the top product, i.e., propylene and water. Should some of the extractive solvent mixture be carried overhead, it is of little consequence to the crude propylene oxide resolution scheme, since the propylene recovered therefrom ultimately returns to the epoxidation reactor system, wherein the extractive solvent mixture, as described hereinafter is formed.

DETAILED DESCRIPTION OF THE INVENTION

Although the invention is applied broadly to the resolution of mixtures comprising propylene oxide in admixture with propylene, water and higher boiling oxygen-containing impurities, it is applied with particular advantage to the recovery of propylene oxide and propylene in a high state of purity from crude propylene oxide-containing mixtures obtained in processes wherein propylene is reacted with an organic hydroperoxide in the presence of a suitable heterogeneous catalyst. Such processes comprise those described and claimed in copending applications of Wulff et al. Ser. Nos. 812,920, 812,922, 812,923, and 812,924, filed Apr. 2, 1969. The crude propylene oxide-containing mixtures charged to the process of the invention comprise those obtained by subjecting the total reaction products from the suitable propylene epoxidation process to initial crude propylene oxide recovery means, which may comprise such steps as, for example, distillation, fractionation, decantation and the like to effect the removal of at least a substantial part of any entrained heterogeneous catalyst, solvent and part of the desired byproducts from the crude propylene oxide to be subjected to the subject separation process. The crude propylene oxide so obtained will generally comprise unconverted propylene in substantial excess. In general, the suitable crude propylene oxide charged to the process of the invention will comprise from about 5 to about 60 percent by weight propylene, and usually from about 5 to about 30 percent by weight propylene oxide. The crude propylene oxide charged to the process of the invention will generally comprise hydrocarbons of paraffinic or aromatic character corresponding to the hydrocarbon moiety of the organic hydroperoxide employed as a reactant in the formation of the crude propylene oxide. Such hydrocarbon components comprise, for example, paraffinic hydrocarbons, particularly isoparaffins such as isopentane, isobutane, etc.; aromatic hydrocarbons particularly aralkyls such as alkyl substituted benzenes, e.g. ethylbenzene and cumene, etc.; as well as homologs thereof.

In accordance with the preferred embodiment of the invention, propylene oxide and propylene are recovered, each in a high state of purity, from a crude propylene oxide, produced by the catalytic epoxidation of propylene with an organic hydroperoxide, and comprising propylene oxide in admixture with propylene, water, and organic impurities comprising the hydrocarbon, alcohol, and/or ketone corresponding to said organic hydroperoxide, by subjecting said crude propylene oxide to extractive distillation in a first extractive distillation zone, under controlled conditions, in the presence of a solvent mixture recycled from within the system, to result in the separation of a vapor overhead comprising only a part of said propylene and water while willfully retaining the remainder of said propylene and water in the liquid bottoms, subjecting the liquid bottoms formed in said first extractive distillation zone to extractive distillation in a second extractive distillation zone in the presence of a further quantity of said solvent mixture recycled from within the system under conditions forming a vapor overhead comprising the remainder of said propylene and water in said second extractive distillation zone, passing liquid bottoms from said second extractive distillation zone into a fractionating zone, separating a vapor overhead comprising substantially pure propylene oxide and a liquid bottoms fraction comprising said hydrocarbon, alcohol and/or ketone corresponding to said organic hydroperoxide in said fractionating zone, and recycling a portion of said liquid bottoms fraction from said fractionating zone to said first and second extractive distillation zones to be used therein as said solvent mixture recycled from within the system.

The composition of the byproduct fraction comprising hydrocarbon and oxygen-containing impurities, recycled from within the system and used as the extractive solvent mixture in the extractive distillation zones may vary widely within the scope of the invention and will be governed to some extent by the source of the crude propylene oxide charge. The extractive solvent will generally comprise a mixture of the hydrocarbon and alcohol component of the feed in which mixture the hydrocarbon is present in predominant amount and which mixture may or may not comprise additionally the ketone is lesser amounts. Suitable byproduct solvent mixtures obtained within the system comprise those wherein the hydrocarbon component is in the range of from about 55 to about 100 m. percent, the alcohol component from about 1 to about 25 m. percent, and the ketone component from about 0 to about 15 m. percent.

In a preferred embodiment of the invention, the extractive solvent employed will generally consist of a mixture of the solvent employed in, and oxygenated byproducts produced by, the epoxidation reaction. Thus, a principal advantage of the present invention is that it employs components already present within the system to aid in the resolution of the crude propylene oxide, and does not require the addition of extraneous materials. When the organic hydroperoxide employed in the epoxidation reactor is ethylbenzene hydroperoxide, the solvent will generally consist of ethylbenzene containing small amounts of acetophenone and methylphenyl carbinol, and the epoxidation reaction's byproducts will include additional quantities of acetophenone and methylphenyl carbinol. The relative proportions of hydrocarbon, alcohol, and ketone comprising a suitable extractive solvent mixture for use in the resolution scheme, when ethylbenzene hydroperoxide is used in the epoxidation reaction, may fall within the ranges of from about 90 to about 100 m. percent, from about 0 to about 5 m. percent, and from about 0 to about 5 m. percent, respectively.

The pressure levels maintained within the successive extractive distillation and fractionation zones will generally decrease in the direction of flow. A highly desirable mode of operation, in fact, one which makes it particularly attractive from a practical standpoint, is one in which the pressure level maintained within the first extractive distillation zone is equivalent to, or slightly below that maintained within the epoxidation reactor. Generally, this will be above about 300 p.s.i.g. Operation of the first extractive distillation zone under such pressure conditions permits the condensation of the overheaded vapor, comprising a portion of the propylene and water contained in the crude propylene oxide, without the use of costly refrigeration and/or repressurization equipment. After phase separation of the overheaded water by known techniques, recovered propylene may be returned to the epoxidation reactor system without requiring recompression. A portion of the propylene so recovered may be mixed with the extractive solvent mixture and returned to said zone.

The process of the present invention effectively minimizes the amount and extent of propylene repressurization requirements. By suitable adjustment of the reboiler temperatures of each of the extractive distillation zones, the pressures maintained therein, and the flows of extractive solvent mixture and refluxed propylene thereto, the temperatures on the top tray of the rectifying sections of said zones will generally be above about 70.0 and 52° C., respectively. Thus, being at a sufficiently high temperature, and pressure, the propylene-rich top product of the first extractive distillation may be condensed with ordinary cooling water, as opposed to refrigeration induced liquefaction, and may be returned to the epoxidation reactor system, for instance, by suitable pumping techniques. In order to avoid the use of refrigeration when condensing the propylene-rich overhead product from the second extractive distillation zone, said product may be compressed in suitable repressurization equipment, and thereafter liquified with ordinary cooling water in a conventional condenser. Such repressurization equipment, however, will be much smaller, in terms of propylene handled, and compression ratio required, than if all propylene contained in the crude propylene oxide were recovered in a single, tempered, distillation zone.

The invention is described more fully hereinafter with reference to the attached drawing, wherein the single FIGURE represents more or less diagrammatically, one form of apparatus suitable for carrying out the invention.

DESCRIPTION OF THE DRAWING

A crude propylene oxide-containing stream, containing propylene oxide in admixture with propylene, water, and heavier oxygen-containing impurities and substantially free of epoxidation catalyst, is forced through line 2 by pump 1 into first extractive distillation zone 3. An extractive distillation solvent mixture, obtained from within the system, as hereinafter described, is added to first extractive distillation zone 3 through line 11.

First extractive distillation zone 3 is preferably operated with a pressure at the top thereof in the range from about 280 to about 300 p.s.i.g. However, higher or lower pressures may be employed in this zone, by suitable adjustment of the flow of extractive solvent thereto, as long as water, also recovered overhead, is not allowed to form a third phase in the upper portion thereof. Accordingly, the temperature on the top stage of said zone will generally be in the range of from about 60° to about 116° C.

Vaporous overhead product, consisting of propylene and water, leaves first extractive distillation zone 3 through line 4, is liquified in condenser 5, and thereafter passes through line 6 into phase separator 7. Water is removed therefrom through line 48, and is disposed of. Propylene may be recycled to the epoxidation reactor through line 8, pump 9, and lines 53, 41 and 54. Some of the phase separated and pressurized propylene flowing in line 53 may be diverted through line 52 and returned to first extractive distillation zone 3 after mixing with extractive solvent mixture passing through line 55. Generally from about 20 to 80 percent of the propylene originally contained in the crude propylene oxide mixture, and from about 50 to about 90 percent of the water similarly contained, will be recovered in the top product from first extractive distillation zone 3.

A bottoms product, consisting essentially of propylene oxide, propylene willfully retained therein, water, and heavier oxygenated and hydrocarbon materials, leaves first extractive distillation zone 3 through line 12 and passes into second extractive distillation zone 13. The use of heterogeneous epoxidation catalysts, such as disclosed and claimed for example by copending applications of Wulff et al. supra, which are generally easily separated from the crude propylene oxide-containing mixture, and rarely entrained therein, still permits operation of reboiler 10 of first extractive distillation zone 3 at considerably higher temperatures than heretofor practiced, without any substantial detriment to propylene oxide and coproducts circulating therethrough. Accordingly, temperatures up to about 230° C. may be employed in this reboiler.

In the second extractive distillation zone 13, conditions are controlled to effect the distillation overhead of substantially all the propylene and water contained in the feed thereto. Extractive solvent mixture enters second extractive distillation zone 13 through line 22. The extractive solvent mixture employed in second extractive distillation zone 13 will generally have substantially the same range of compositions as that employed in first extractive distillation zone 3. In the preferred embodiment of the invention, the composition of the extractive solvent mixture employed in the two extractive distillation zones will be nearly identical, having been obtained, for example, from a single, common flash, as described hereinafter.

The operating pressure of second extractive distillation zone 13 will generally be below that maintained in the fist extractive distillation zone 3, that is, from about 80 to about 120 p.s.i.g.; higher or lower pressures may be employed in second extractive distillation zone 13, by suitable adjustment of the flow of extractive solvent thereto. Likewise, the absence of any substantial quantity of entrained epoxidation catalyst permits reboiler 23 to operate at temperatures up to about 230° C., without any substantial amount of propylene oxide or coproduct degradation therein. The temperature at the top of second extractive distillation zone 13 is maintained within the range from about 49° to about 94° C., in a manner to prevent separation of water as a distinct phase.

The vaporous overhead product from second extractive distillation zone 13, consisting essentially of propylene and water, exits therefrom through line 14 and enters compressor 15 wherein, by known techniques, its pressure is raised to approximately the level maintained within first extractive distillation zone 3. Leaving compressor 15, gaseous propylene flows through line 16 into condenser 17, and thereafter, through line 18 into phase separator 19. Water will be withdrawn therefrom via line 49, and be discarded. Propylene will leave separator 19 through line 20, and may be recycled to the epoxidation reactor through pump 21 and lines 42 and 54. A portion of the propylene discharged from pump 21 and flowing in line 56 may be diverted through line 51 and returned to second extractive distillation zone 13 after mixing with extractive solvent mixture flowing in line 22.

The bottom product from second extractive distillation zone 13, completely freed of propylene and water, and consisting of propylene oxide in admixture with heavier oxygenated and hydrocarbon materials contained in the crude propylene oxide and extractive solvent mixtures, passes through line 24 to propylene oxide fractionation zone 25. Vaporous propylene oxide, in a highly purified state, leaves propylene oxide fractionation zone 25 through line 26, and passes thereafter through condenser 27, line 28, and into accumulator 29. A portion of the overheaded propylene oxide is returned to propylene oxide fractionation zone 25 as reflux through line 30, pump 31, and line 32. Purified propylene oxide, suitable for sale or further chemical conversion, exits the resolution scheme through line 47. Propylene oxide fractionation zone 25 is conveniently maintained at a pressure of from about 10 to about 50 p.s.i.g.

The bottoms from propylene oxide fractionation zone 25, consisting of a mixture of the heavier oxygenated and hydrocarbon materials contained in the crude propylene oxide and the two extractive distillation solvent mixtures, is subjected to any suitable separation technique, to recover the extractive solvent mixture. In a preferred embodiment of the invention, the bottoms from propylene oxide fractionation zone 25 are removed therefrom through line 34 and enter flash zone 35. The overhead vapor, being the sum of extractive solvent mixtures streams fed to extractive distillation zones 3 and 13, exits flash zone 35 through line 36, is liquified in condenser 37, and passes into pump 39 through suction line 38. Liquified extractive solvent mixtures is forced through line 40, and returned to extractive distillation zones 3 and 13 through lines 11 and 22, respectively. Heavy oxygenated and hydrocarbon materials leave flash zone 35 through line 50, and may be further treated to resolve the components contained therein.

EXAMPLE

The following example is presented to further illustrate this invention, but is not intended as limiting the scope thereof. In the example, reference will be made to various pieces of equipment in the figure, as well as to streams flowing in lines therein. Unless otherwise stated, all parts and percents in this example are expressed on a molar basis.

A crude propylene oxide having the following approximate composition

| | |
|---|---|
| Propylene | 47.30% |
| Propane | 8.05% |
| Water | 1.01% |
| Propylene oxide | 8.25% |
| Methylphenyl carbinol | 9.16% |
| Acetophenone | 3.33% |
| Ethylbenzene | 22.90% | is produced by the reaction of ethylbenzene-diluted ethylbenzene hydroperoxide in the liquid phase, at a temperature of 110° C., with an excess of propylene, in a continuous reactor containing a fixed bed of a heterogeneous titanium oxide-silica catalyst, substantially as described and claimed in copending application Ser. No. 812,920.

With the aid of pump 1, 99.3 moles/hr. of a crude propylene oxide so obtained is forced through line 2 into first extractive distillation zone 3. The manner in which said first extractive of distillation zone is operated in table I.

TABLE I.—TYPICAL OPERATION OF FIRST EXTRACTIVE DISTILLATION ZONE 18 equilibrium stages (including reboiler)
Reboiler temperature: 204.4° C.
Zone pressure: 300 p.s.i.g.
Top stage temperature: 76.7° C.
C$_3$S reflux: 0.154 mole/mole feed

| Stream | Component[1] flows, moles/hr | | | | | | |
|---|---|---|---|---|---|---|---|
| | C$_3^-$ | C$_3^\circ$ | H$_2$O | PO | EB | AcPh | MPC |
| Crude PO in line 2 | 47. | 8. | 1. | 8.2 | 22.7 | 3.3 | 9.1 |
| Extractive solvent mixture in line 11 | | | | | 15.23 | .57 | .53 |
| Top product in line 41 | 37.6 | 6.09 | .79 | .02 | 0.5 | | |
| Bottom product in line 12 | 9.4 | 1.91 | .21 | 8.18 | 37.43 | 3.87 | 9.63 |
| Fraction recovered overhead | .8 | .761 | .790 | .002 | .022 | | |

[1] Abbreviations: C$_3^-$=propylene; C$_3^\circ$=propane; H$_2$O=water; PO=propylene oxide; EB=ethylbenzene; AcPh=acetophenone; MPC=methylphenyl carbinol; C$_3$S=phase separated propylene/propane top product.

The vapor leaving the top of first extractive distillation zone 3 passes through line 4, condenser 5, line 6, and into phase separator 7. Ordinary cooling water may be employed to liquify the overhead gaseous product from first extractive distillation zone 3 in condenser 5. The liquified, phase-separated organic phase, consisting of propylene and propane, is withdrawn from phase separator 7 through line 8 by pump 9. The discharge from pump 9, the propylene/propane stream flowing in line 53, is split between reflux to first extractive distillation zone 3, line 52, and recycle to the epoxidation reactors, line 41. Propylene/propane to be refluxed flows through line 52, and mixes with the extractive distillation solvent flowing in line 53. The extractive solvent mixture and C$_3$S reflux are returned to the top stage of extractive distillation zone 3 through line 11.

The bottom product from first extractive distillation zone 3, flowing in line 12, is fed to second extractive distillation zone 13. Operation of said second extractive distillation zone is detailed in table II.

TABLE II.—TYPICAL OPERATION OF SECOND EXTRACTIVE DISTILLATION ZONE 47 equilibrium stages (including reboiler)
Reboiler temperature: 204.4° C.
Top stage temperature: 54.4° C.
Zone pressure: 132 p.s.i.g.
C$_3$S reflux: 0.118 mole/mole feed

| Stream | Component flows, moles/hr. | | | | | | |
|---|---|---|---|---|---|---|---|
| | C$_3^-$ | C$_3^\circ$ | H$_2$O | PO | EB | AcPh | MPC |
| Feed in line 12 | 9.4 | 1.91 | .21 | 8.18 | 37.43 | 3.87 | 9.63 |
| Extractive solvent mixture in line 22 | | | | | 23.57 | .89 | .93 |
| Top product in line 42 | 9.4 | 1.91 | .21 | .02 | 0.1 | | |
| Bottom product in line 24 | | | | 8.16 | 60.9 | 4.76 | 10.56 |
| Fraction recovered overhead | 1.0 | 1.0 | 1.0 | .0025 | .0027 | | |

The vaporous product which leaves the top of second extractive distillation zone 13 passes through line 14 and thereafter into compressor 15, wherein its pressure is increased to about 300 p.s.i.g. Repressurized propylene exits compressor 15 through line 16, is liquified in condenser 17, and passes through line 18 into phase separator 19. Again, ordinary cooling water may be employed to condense the compressed overheaded product. Phase separated water exits separator 19 through line 49, and is discarded. Recovered propylene is removed from separator 19 through line 20 with the aid of pump 21, and is discharged into line 56. A portion of the propylene flowing in line 56 passes through line 42 and joins the propylene recovered in first extractive distillation zone 3, and flowing in line 53, for recycle to the epoxidation reactor system, now shown, via line 54. The remainder of the propylene phase separated in phase separator 19 flows through line 51, mixes with extractive solvent flowing in line 22, and is returned to the top stage of second extractive distillation zone 13.

The bottom product from second extractive distillation zone 13, containing propylene oxide in admixture with ethylbenzene, acetophenone, and methylphenyl carbinol, flows through line 24 into propylene oxide fractionation zone 25. The flows and conditions prevailing in propylene oxide fractionation zone 25 are outlined in table III.

TABLE III.—TYPICAL OPERATION OF PROPYLENE OXIDE FRACTIONATION ZONE 14 equilibrium stages (including reboiler)
Reboiler temperature: 204.4° C.
Top stage temperature: 65.6° C.
Zone pressure: 40 p.s.i.g.
PO reflux: 0.1 mole/mole feed

| Stream | Component flows, moles/hr. | | | |
|---|---|---|---|---|
| | PO | EB | AcPh | MPC |
| Feed in line 24 | 8.16 | 60.9 | 4.76 | 10.56 |
| Top product in line 47 | 8.14 | | | |
| Bottom product in line 34 | 0.02 | 60.9 | 4.76 | 10.56 |
| Fraction recovery overhead | .998 | | | |

The gaseous overhead product from propylene oxide fractionation zone 25 passes through line 26, condenser 27, line 28, and into accumulator 29. Ordinary cooling water is employed to liquify the propylene oxide product in condenser 27. Pump 31 withdraws propylene oxide from accumulator 29 through line 30, refluxes part of it to propylene oxide fractionation zone 25 through line 32, and forces the remainder from the system through line 47 to sales or further chemical conversions.

The bottom product from propylene oxide fractionation zone 25, consisting of ethylbenzene, acetophenone, and methylphenyl carbinol, may be treated in any suitable piece of diffusional separation equipment to recover the extractive solvent mixture returned to the first and second extractive distillation zones. The bottom product from the propylene oxide fractionation zone is flashed, details of which are outlined in table IV. For the indicated pressure and temperature of the flash, which are not critical to the invention, appropriate vacuum equipment will be required. The temperature and pressure of the flash indicated in table IV is only one of many possible combinations of these parameters which may be employed and their citation is not intended to limit the scope of the invention. The overhead product from flash zone 35, comprising the sum of the extractive solvent mixture streams returned to the first and second extractive distillation zones, passes through line 36, and is liquified in air- or water-cooled condenser 37. The condensed, combined extractive solvent mixture stream enters pump 39 through suction line 38, and is forced through line 40. By suitable manifolding approximately 60.5 percent of the combined stream is returned to second extractive distillation zone 13 through line 22, and the remainder is recycled to first extractive distillation zone 3 through lines 55 and 11.

TABLE IV

Typical Operation of Extractive Solvent Mixture Flash Recovery Zone

| Stream | Component Flows, Moles/hr. | | |
|---|---|---|---|
| | EB | AcPh | MPC |
| Feed in line 34 | 60.9 | 4.76 | 10.56 |
| Bottom Product in line 50 | 22.1 | 3.3 | 9.1 |
| Top Product in line 36 | 38.80 | 1.46 | 1.46 |

Flash temperature: 115.6° C.
Flash pressure: 5.5 p.s.i.g.

We claim as our invention:

1. A process for continuously separating propylene oxide and propylene, each in a high state of purity, from a crude propylene oxide obtained by the catalytic epoxidation of propylene with an organic hydroperoxide and containing said propylene oxide in admixture with propylene, water, and organic impurities comprising the hydrocarbon, alcohol, and ketone corresponding to said organic hydroperoxide, consisting essentially of extractively distilling said crude propylene oxide in an extractive distillation zone to which an extractive solvent mixture consisting essentially of said organic impurities is added as a separate stream.

2. A process for continuously separating propylene oxide and propylene, each in a high state of purity, from a crude propylene oxide obtained by the catalytic epoxidation of propylene with an organic hydroperoxide and containing said propylene oxide in admixture with propylene, water, and organic impurities comprising the hydrocarbon, alcohol, and ketone corresponding to said organic hydroperoxide, consisting essentially of extractively distilling said crude propylene oxide in an extractive distillation zone, to which an extractive solvent mixture obtained from within the system is added as a separate stream, under conditions resulting in the formation of an extractive distillation overhead product comprising propylene and water and extractive distillation bottom product comprising propylene oxide in admixture with said organic impurities, fractionating said extractive distillation bottom product in a fractionating zone, thereby separating propylene oxide as a vapor overhead product and said organic impurities as a liquid bottoms fraction in said fractionating zone, and passing at least a part of said liquid bottoms fraction from said fractionating zone to said extractive distillation zone to be used therein as said extractive solvent mixture obtained from within the system.

3. A process for continuously separating propylene oxide and propylene, each in a high state of purity, from a crude propylene oxide obtained by the catalytic epoxidation of propylene with an organic hydroperoxide and containing said propylene oxide in admixture with propylene, water, and organic impurities comprising the hydrocarbon, alcohol, and ketone corresponding to said organic hydroperoxide, consisting essentially of a. extractively distilling said crude propylene oxide in a first extractive distillation zone by the addition of an extractive solvent mixture as a separate stream, obtained originally from within the system, under controlled extractive distillation conditions resulting in the formation of a vapor overhead product comprising only part of said propylene and water while willfully retaining a substantial part of said propylene in the liquid bottom product;

b. extractively distilling the liquid bottom product from said first extractive distillation zone in a second extractive distillation zone by the addition to said second zone of an additional quantity of said extractive solvent mixture as a separate stream, likewise originally obtained from within the system, separating a vapor overhead product comprising the remainder of said propylene and water from a liquid bottom product comprising propylene oxide, said solvent mixture, and organic impurities;

c. fractionating said second extractive distillation zone bottom product in a separate fractionating zone, thereby separating a vapor overhead comprising substantially pure propylene oxide from a liquid fraction comprising said organic impurities; and d. passing at least a part of said liquid fraction from said fractionating zone to said first and second extractive distillation zones to be used therein as said solvent mixture obtained from within the system.

4. The process in accordance with claim 3 wherein said organic hydroperoxide is an aralkyl hydroperoxide.

5. The process in accordance with claim 3 wherein said organic hydroperoxide is ethylbenzene hydroperoxide.

6. The process in accordance with claim 3 wherein the temperature within reboilers of said extractive distillation and fractionating zones may be as high as 230° C.

7. The process in accordance with claim 3 wherein a progressively decreasing pressure range is maintained in said extractive distillation and fractionating zones in the direction of flow.

8. The process in accordance with claim 3 wherein the temperature maintained at the top stages of the rectifying sections of the first and second extractive distillation zones are about 60° to about 116° and about 49° to about 94° C., respectively.

9. The process in accordance with claim 3 wherein said extractive solvent mixture employed in said extractive distillation zones is obtained from within the system by flashing said liquid fraction from said fractionating zone, and thereafter condensing the overhead vapor product from said flash.

10. The process in accordance with claim 3 wherein said extractive solvent mixture is added to the top stage of each of said first and second extractive distillation zones.

* * * * *